United States Patent Office 3,674,356
Patented July 4, 1972

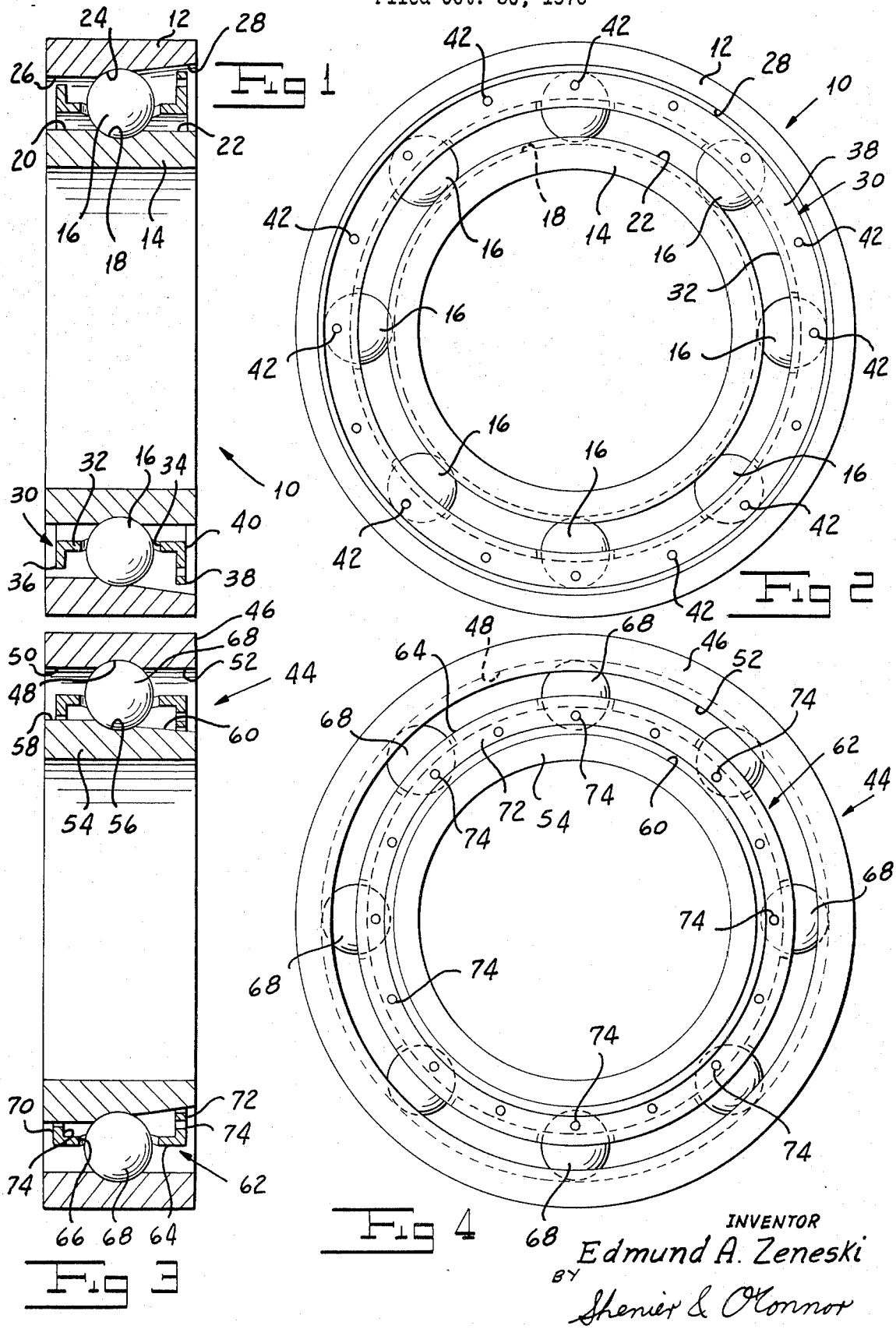

3,674,356
CAGE FOR ANGULAR CONTACT
BALL BEARING
Edmund A. Zeneski, Bethel, Conn., assignor to The
Barden Corporation, Danbury, Conn.
Filed Oct. 30, 1970, Ser. No. 85,457
Int. Cl. F16c 33/66, 33/38
U.S. Cl. 308—187                              9 Claims

ABSTRACT OF THE DISCLOSURE

A cage for the balls of an angular contact ball bearing having the shoulder bounding the raceway of one of its rings at least partially removed in which the cage has a central annular body with ball receiving openings and respective edge flanges extending radially toward said one ring to locations closely adjacent to the cut-away shoulder and adjacent to the remaining shoulder to permit the cage to be controlled by the one ring and to form a lubricant retaining channel into which lubricant can be injected through holes in the flange extending toward the cut-away shoulder.

BACKGROUND OF THE INVENTION

One form of ball bearing known in the prior art is the angular contact bearing in which one shoulder bounding the raceway of one of the rings is at least partially cut away. Bearings of this type generally permit the use of a larger number of balls for greater load capacity than do deep groove bearings. They are generally for high speed applications.

Many angular contact bearings are provided with ball cages or separators comprising annular bodies having speed openings for receiving the balls. With the annular body adjacent to the ring having the cut-away shoulder only the remaining shoulder controls the separator so that the assembly is not as stable in operation as is desirable. Further, owing to the fact that angular contact bearings are not normally shielded grease tends to be thrown out of the bearing at normal operating speeds.

I have invented a ball separator which overcomes the defects of angular contact bearing assemblies of the prior art. My separator provides more stable operation of the assembly than that of assemblies using separators of the prior art. My separator serves as a lubricant retainer. It is simple and is inexpensive to construct for the result achieved thereby.

SUMMARY OF THE INVENTION

One object of my invention is to provide a separator for angular contact bearings which overcomes the defects of angular contact separators of the prior art.

Another object of my invention is to provide a ball separator which provides more stable operation of an angular contact bearing assembly than do ball separators of the prior art.

A further object of my invention is to provide a ball separator which forms a lubricant retaining reservoir.

Still another object of my invention is to provide an improved ball separator which is simple in construction and inexpensive to manufacture.

Other and further objects of my invention will appear from the following description.

In general my invention contemplates the provision of a ball separator for an angular contact bearing having the shoulder of one of its ring raceways at least partially removed in which the separator is formed with peripheral radially extending flanges at the edges of an annular body having ball receiving recesses. One flange extends to a location closely adjacent to the cut-away shoulder while the other flange extends to a location closely adjacent to the other shoulder of the same raceway to form a lubricant retaining channel into which lubricant can be injected through holes in the one flange.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of an angular contact bearing assembly incorporating the preferred form of my ball separator.

FIG. 2 is an elevation of the bearing assembly illustrated in FIG. 1.

FIG. 3 is a sectional view of an angular contact bearing assembly incorporating an alternate form of my ball separator.

FIG. 4 is an elevation of the bearing assembly shown in FIG. 3.

DESCRIPTION OF THE PREFERRED EMBODIMENT

Referring now to FIGS. 1 and 2 of the drawings, an angular contact bearing assembly, indicated generally by the reference character 10, includes an outer ring 12, an inner ring 14 and ball 16. The ring 14 is formed with a raceway 18 bounded by annular lands or shoulders 20 and 22. Outer ring 12 is formed with a raceway 24 bounded on one side by an annular land or shoulder 26. The other shoulder which normally would bound raceway 24 at the other side of the ring 12 is at least partially removed as is known in the art to leave an inclined surface 28. With the bearing 10 assembled balls 16 ride between rings 12 and 14 in raceways 24 and 18.

The form of my ball separator, indicated generally by the reference character 30, may be formed from any suitable material such for example as a phenolic resin or the like, separator 30 is made up of a central annular body 32 formed with a plurality of circumferentially spaced openings 34 for receiving the balls 16 of the assembly.

I provide the separator 30 with a first, radially outwardly extending peripheral flange 36 along the edge of body 32 adjacent to the shoulder 26. Flange 36 extends outwardly to a location relatively close to shoulder 26 so that the flange and the shoulder cooperate to provide a part of the control of the separator in operation of the assembly 10.

I provide body 32 with a second radially outwardly extending peripheral flange 38 at the other edge of the body 32. Flange 38 extends outwardly from body 32 for a further distance than does flange 36 and to a location closely adjacent to surface 28 so that flange 36 and surface 38 cooperate to complete the control of the separator 30 in operation of the bearing assembly 10.

It will be appreciated that the radial thickness of the annular body 32 between its flanges might be increased so as substantially to eliminate the flanges and to provide surface for cooperation with shoulder 26 and surface 28 respectively. However, I form the separator 30 in the manner shown so as to provide an annular channel 40 between the flanges. This channel provides a reservoir for lubricant, such as grease, which is prevented from being thrown outwardly by the flanges 36 and 38.

I provide the flange 38 with a plurality of spaced openings 42 distributed around the periphery of the flange. The openings permit lubricant to be injected into the channel 40 as required. The number of openings 42 in flange 38 bears a relationship to the number of balls 16 in the assembly. In the particular embodiment shown in FIGS. 1 and 2, there are twice as many holes as the number of balls 16.

Referring now to FIGS. 3 and 4, an angular contact bearing assembly, indicated generally by the reference character 44 comprises an outer ring 46 provided with a raceway 48 bounded by shoulders 50 and 52. The inner ring 54 of the assembly has a raceway bounded along one edge by a shoulder 53. The material at the other edge which normally would form a shoulder is removed to leave a surface 60.

The form of my retainer, indicated generally by the reference character 62, used in the assembly 44 comprises a central annular body 64 provided with openings 66 for receiving the balls 68 of the assembly. At its edge adjacent to the shoulder 58 provide body 64 with a radially inwardly directed peripheral flange 70 extending to a location closely adjacent to shoulder 58 so that the flange 70 and shoulder 58 contribute to the stability of the assembly. A second radially inwardly extending peripheral flange 72 at the other edge of the body extends further inwardly than does flange 70 and to a location closely adjacent to the surface 60 so that the flange 72 and surface 60 cooperate to contribute to the stability of the assembly.

Flanges 70 and 72 form an annular lubricant reservoir 74 in the space between inner ring 54 and body 64. The flanges inhibit the escape of lubricant from the reservoir in normal operation of the bearings. Holes 74 similar to the hole 42 permit lubricant to be injected into the reservoir 74 through flange 72.

In operation of the form of my separator shown in FIGS. 1 and 2 as the assembly 10 rotates flanges 36 and 38 cooperate with shoulder 26 and the surface 28 to ensure the stability of the bearing assembly. At the same time the flanges 36 and 38 prevent lubricant from being thrown out of the reservoir 40 at normal operating speeds. Additional lubricant may be introduced as required through the holes 42. The operation of the form of my invention shown in FIGS. 3 and 4 is substantially the same.

It will be seen that I have accomplished the objects of my inventions, I have provided a ball separator for angular contact bearings which overcomes the defects of ball separators of the prior art. It ensures more stable operation of bearings assemblies than is provided by separators of the prior art. My separator provides a lubricant reservoir and inhibits escape of lubricant at normal operating speeds. It is simple in construction and is relatively inexpensive to manufacture.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A ball bearing including in combination, an outer ring having a raceway with a generally arcuate radial cross-sectional shape, an inner ring having a raceway with a generally arcuate radial cross-sectional shape, a shoulder bordering one of said raceways at one edge thereof, a surface at the other edge of said raceway extending from the edge of the one raceway ring into said raceway at a location below the level of said shoulder, respective shoulders bounding said other raceway, balls disposed between said rings in said raceways, and a ball separator disposed between said rings, said separator comprising an annular body provded with radial openings axially generally centrally located for receiving said balls, a first annular flange adjacent to one edge of said body extending generally radially toward said surface and a second annular flange adjacent to the other edge of said body extending generally radially toward said one raceway shoulder, said first flange having a greater radial extent than said second flange, said flange being outboard of said holes whereby said flanges and said annular body form a lubricant reservoir.

2. An assembly as in claim 1 in which one of said flanges is formed with means for permitting the introduction of lubricant into said reservoir.

3. An assembly as in claim 1 in which said one raceway is an outer raceway and in which said flanges extend radially outwardly.

4. An assembly as in claim 1 in which said one raceway is an inner raceway and in which said flanges extend radially inwardly.

5. A retainer for an angular contact bearing including an annular body provided with circumferenetially spaced axially generally centrally located ball-receiving openings therein, a first annular flange adjacent to one edge of said body and extending generally radially in one direction, a second annular flange adjacent to the other edge of said body and extending generally radially in said direction for a distance greater than said first flange, said flanges being outboard of said holes whereby said flanges and the central portion of said body form a lubricant retaining reservoir.

6. A retainer as in claim 5 in which said direction is outward.

7. A retainer as in claim 5 in which said direction is inward.

8. A retainer as in claim 5 in which one of said flanges is provided with openings for admitting lubricant to said reservoir.

9. A retainer as in claim 8 in which said one flange is said first flange.

References Cited

UNITED STATES PATENTS

| | | | |
|---|---|---|---|
| 1,192,470 | 7/1916 | Starin | 308—193 |
| 1,297,579 | 3/1919 | Lockwood | 308—193 |
| 2,052,897 | 9/1936 | Sanders | 308—187 |
| 3,113,812 | 12/1963 | Dotter | 308—187 |

MARTIN P. SCHWADRON, Primary Examiner

F. SUSKO, Assistant Examiner

U.S. Cl. X.R.

308—201